(12) United States Patent
Hayashi

(10) Patent No.: US 11,480,727 B2
(45) Date of Patent: Oct. 25, 2022

(54) MULTI-CORE OPTICAL FIBER

(71) Applicant: SUMITOMO ELECTRIC INDUSTRIES, LTD., Osaka (JP)

(72) Inventor: Tetsuya Hayashi, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 44 days.

(21) Appl. No.: 16/915,015

(22) Filed: Jun. 29, 2020

(65) Prior Publication Data
US 2021/0003773 A1  Jan. 7, 2021

(30) Foreign Application Priority Data

Jul. 3, 2019 (JP) .............................. JP2019-124563

(51) Int. Cl.
G02B 6/02 (2006.01)
G02B 6/028 (2006.01)
G02B 6/036 (2006.01)

(52) U.S. Cl.
CPC ......... *G02B 6/02042* (2013.01); *G02B 6/028* (2013.01); *G02B 6/036* (2013.01)

(58) Field of Classification Search
CPC . G02B 6/02042; G02B 6/0283; G02B 6/0214
See application file for complete search history.

(56) References Cited

U.S. PATENT DOCUMENTS

| 9,529,144 B2* | 12/2016 | Ishida ................ G02B 6/02042 |
| 2011/0274398 A1 | 11/2011 | Fini et al. |
| 2012/0134637 A1 | 5/2012 | Imamura |
| 2013/0251320 A1 | 9/2013 | Hayashi |

(Continued)

FOREIGN PATENT DOCUMENTS

| EP | 3029498 A1 | 6/2016 |
| EP | 3171205 A1 | 5/2017 |
| WO | WO-2018150867 A1 * | 8/2018 ............... G02B 6/04 |

OTHER PUBLICATIONS

Amma, Y. et al., "High-density Multicore Fiber with Heterogeneous Core Arrangement." Opt. Fiber Commun. Conf. (OFC), Los Angeles, 2015, p. Th4C.4.

(Continued)

*Primary Examiner* — Eric Wong
(74) *Attorney, Agent, or Firm* — Faegre Drinker Biddle & Reath LLP

(57) ABSTRACT

An MCF according to one embodiment simultaneously achieves excellent economic rationality and high compatibility in short-distance optical transmission. The MCF includes a plurality of core portions, a common cladding, and a resin coating. Each of the core portions includes a core, an inner cladding, and a trench layer. At least four core portions arranged on a straight line have substantially the same relative refractive index difference between the core and the inner cladding. The refractive index profile of a first core portion and a second core portion adjacent to each other among the four core portions has a shape in which the refractive index of the inner cladding is offset with respect to the refractive index of the common cladding so that the magnitude relationship of the refractive index between the inner cladding and the common cladding is reversed.

17 Claims, 8 Drawing Sheets

(56) References Cited

U.S. PATENT DOCUMENTS

| | | | |
|---|---|---|---|
| 2014/0199039 A1* | 7/2014 | Kokubun | G02B 6/02042 385/126 |
| 2015/0139596 A1* | 5/2015 | Ishida | G02B 6/02042 385/124 |
| 2015/0147039 A1* | 5/2015 | Ishida | G02B 6/02042 385/124 |
| 2015/0277032 A1* | 10/2015 | Hayashi | G02B 6/02042 385/126 |
| 2017/0235043 A1* | 8/2017 | Amma | G02B 6/02014 385/126 |

OTHER PUBLICATIONS

Butler, D. L. et al., "Multicore optical fiber and connectors for short reach, high density links," IEEE Photon. Conf. (IPC), Burlingame, CA, USA, 2012, pp. 878-879.

Geng, Y. et al., "High-speed, bi-directional dual-core fiber transmission system for high-density, short-reach optical interconnects," Proc. of SPIE, San Francisco, vol. 9390, Next-Generation Optical Networks for Data Centers and Short-Reach Links II, 2015, p. 939009-1-p. 939009-10.

Gonda, T. et al., "125 µm 5-core fibre with heterogeneous design suitable for migration from single-core system to multi-core system," Eur. Conf. Opt. Commun. (ECOC), Düsseldorf, 2016, pp. 547-549.

Hayashi, T. et al., "125-µm-Cladding 8-Core Multi-Core Fiber Realizing Ultra-High-Density Cable Suitable for O-Band Short-Reach Optical Interconnects," Opt. Fiber Commun. Conf. (OFC), Los Angeles, 2015, p. Th5C.6.

Kokubun, Y. et al., "Selective mode excitation and discrimination of four-core homogeneous coupled multi-core fiber," Optics Express, 2011, vol. 19, No. 26, p. B905-p. B914.

Matsui, T. et al., "Design of 125 µm cladding multi-core fiber with full-band compatibility to conventional single-mode fiber," Eur. Conf. Opt. Commun. (ECOC), Valencia, 2015, p. We.1.4.5.

Sasaki, Y. et al., "Crosstalk-Managed Heterogeneous Single-Mode 32-Core Fibre," Eur. Conf. Opt. Commun. (ECOC), 2016, pp. 550-552.

* cited by examiner

Fig.6

| | | UNIT | #1 | #2 | #3 | #4 |
|---|---|---|---|---|---|---|
| | ARRANGEMENT OF CORE PORTION | | SERIES | SERIES | SERIES | SQUARE LATTICE |
| | NUMBER OF CORE PORTIONS | | 4 | 4 | 4 | 12 |
| FIRST CORE PORTION | $\Delta_{co,1}$ | % | 0.372 | 0.390 | 0.390 | 0.390 |
| | $\Delta_{ic,1}$ | % | 0.033 | 0.050 | 0.020 | 0.050 |
| | $\Delta_{t,1}$ | % | -0.750 | -0.750 | -0.750 | -0.750 |
| | $a_1$ | µm | 3.5 | 3.7 | 3.8 | 3.7 |
| | $b_1$ | µm | 8.9 | 9.3 | 10.1 | 9.3 |
| | $c_1$ | µm | 10.25 | 10.8 | 11.2 | 10.8 |
| SECOND CORE PORTION | $\Delta_{co,2}$ | % | 0.336 | 0.340 | 0.350 | 0.350 |
| | $\Delta_{ic,2}$ | % | -0.006 | 0.000 | -0.030 | -0.030 |
| | $\Delta_{t,2}$ | % | -0.750 | -0.750 | -0.750 | -0.750 |
| | $a_2$ | µm | 3.5 | 3.6 | 3.8 | 3.8 |
| | $b_2$ | µm | 8.9 | 9.1 | 10.0 | 10.0 |
| | $c_2$ | µm | 12.25 | 12.7 | 12.8 | 12.8 |
| | $\Lambda$ | µm | 24 | 24 | 24 | 36 |
| | $w$ | µm | 1.5 | 0.5 | 0 | 12.4 |
| | $d$ | µm | -1 | -0.95 | -0.8 | -1 |
| | OCT | µm | 26.5 | 26.5 | 26.5 | 34.7 |
| | CLADDING OUTER DIAMETER | µm | 125 | 125 | 125 | 180 |

Fig.7

| | FIRST CORE PORTION | | | | | SECOND CORE PORTION | | | | | |
|---|---|---|---|---|---|---|---|---|---|---|---|
| | $\lambda_{cc}$ | $\lambda_0$ | $S_0$ | MFD | LEAKAGE LOSS | $\lambda_{cc}$ | $\lambda_0$ | $S_0$ | MFD | LEAKAGE LOSS | INTER-CORE XT |
| UNIT | μm | nm | ps/(nm²km) | μm | dB/km | μm | nm | ps/(nm²km) | μm | dB/km | km⁻¹ |
| #1 | 1.19 | 1316 | 0.090 | 8.6 | ≤0.007 | 1.07 | 1310 | 0.094 | 8.6 | ≤0.006 | $5.1 \times 10^{-4}$ |
| #2 | 1.21 | 1312 | 0.089 | 8.6 | ≤0.01 | 1.16 | 1309 | 0.091 | 8.6 | ≤0.01 | $<1 \times 10^{-4}$ |
| #3 | 1.15 | 1313 | 0.088 | 8.6 | ≤0.003 | 1.11 | 1310 | 0.089 | 8.6 | ≤0.003 | $3.3 \times 10^{-4}$ |
| #4 | 1.21 | 1312 | 0.089 | 8.6 | ≤0.01 | 1.11 | 1310 | 0.089 | 8.6 | ≤0.01 | $3.9 \times 10^{-7}$ |

MULTI-CORE OPTICAL FIBER

TECHNICAL FIELD

The present disclosure relates to a multi-core optical fiber.

BACKGROUND

In recent years, studies have been vigorously promoted on a multi-core optical fiber (hereinafter referred to as "MCF") including a plurality of cores and a common cladding surrounding each of the plurality of cores, as an optical transmission medium for long-haul communications.

For example, Non-Patent Document 1, (T. Matsui et al., "Design of 125 μm cladding multi-core fiber with full-band compatibility to conventional single-mode fiber," in Eur. Conf. Opt. Commun. (ECOC), Valencia, 2015, p. We. 1.4.5) has disclosed an MCF in which four trench-assisted structure cores arranged to form a square lattice in the fiber cross section (cores compatible with cores specified in ITU-T G.652 standards: hereinafter referred to as "G.652 compatible core") are incorporated in a cladding with an outer diameter of 125 μm. Non-Patent Document 1 discloses that the MCF achieves optical characteristics compatible with a fiber (hereinafter, "G.652 fiber") defined by the ITU-T G.652 standards in a wavelength range (1260 nm or more and 1625 nm or less) from O-band to L-band.

Non-Patent Document 2 (T. Hayashi et al., "125-μm-Cladding 8-Core Multi-Core Fiber Realizing Ultra-High-Density Cable Suitable for O-Band Short-Reach Optical Interconnects," in Opt. Fiber Commun. Conf. (OFC), Los Angeles, 2015, p. Th5C.6) has disclosed an MCF in which eight G.652 compatible cores (having a trench-assisted structure) are arranged in an annular shape so as to be incorporated in a cladding having an outer diameter of 125 μm. Non-Patent Document 2 discloses that the MCF achieves optical characteristics compatible with G.652 fibers in the O-band (1260 nm or more and 1360 nm or less) alone. In the wavelength range from C-band to L-band (1530 nm or more and 1625 nm or less), light in the core might couple to the coating or leak to the coating, resulting in transmission loss increase. Therefore, in the wavelength range from the C-band to the L-band, the MCF disclosed in Non-Patent Document 2 is not compatible with the G.652 fibers.

Non-Patent Document 3 (D. L. Butler et al., "Multicore optical fiber and connectors for short reach, high density links," in IEEE Photon. Conf. (IPC), Burlingame, Calif., USA, 2012, pp. 878-879) has disclosed a four-core fiber (MCF) incorporating four cores arranged in a line in a circular cladding. Non-Patent Document 3 does not disclose the cladding outer diameter, the structure or characteristics of individual cores, but suggests that the cladding outer diameter of the four-core fiber is larger than the standard outer diameter of 125 μm. From the comparison between FIGS. 1 and 3 in Non-Patent Document 3, the core pitch of the fiber in FIG. 1 is estimated to be 50 μm, and the outer diameter of the cladding is also estimated to be around 200 μm.

Non-Patent Document 4 (Y. Geng et al., "High-speed, bi-directional dual-core fiber transmission system for high-density, short-reach optical interconnects," in Proc. SPIE, San Francisco, 2015, vol. 9390, Next-Generation Optical Networks for Data Centers and Short-Reach Links II, p. 939009) has disclosed a two-core fiber (MCF) having two step-indexed cores incorporated in a 125 μm outer diameter cladding. In this two-core fiber, two cores are arranged at the same distance from the center of the cladding in the fiber cross section. Furthermore, each of the cores has a mode field diameter (hereinafter, referred to as "MFD") of 8.1 μm and a cutoff wavelength of 1160 nm, at a wavelength of 1310 nm. Non-Patent Document 4 discloses that such a core arrangement can sufficiently suppress transmission loss and crosstalk (hereinafter, referred to as "XT") at each of wavelengths of 1310 nm, 1490 nm, and 1550 nm. Non-Patent Document 4 further discloses that the number of cores equivalent to an LC duplex connector can be achieved by an LC simplex connector by mounting the two-core fiber on the LC simplex connector.

Non-Patent Document 5 (Y. Kokubun, T. Komo, K. Takenaga, S. Tanigawa, and S. Matsuo, "Selective mode excitation and discrimination of four-core homogeneous coupled multi-core fiber," Optics express, vol. 19, no. 26, pp. B905-B914, 2011) has disclosed a four-core fiber (MCF) in which four step-index cores are incorporated in a cladding having an outer diameter of 125 pin. This four-core fiber is a strongly coupled MCF in which four cores are arranged close to each other in a line. That is, the fiber according to Non-Patent Document 5 is a fiber that performs wave guiding in a propagation mode using all four cores as one waveguide and thus cannot suppress inter-core crosstalk.

Each of Non-Patent Document 6 (Y. Amma et al., "High-density Multicore Fiber with Heterogeneous Core Arrangement," in Opt. Fiber Commun. Conf. (OFC), Los Angeles, 2015, p. Th4C.4), Non-Patent Document 7 (T. Gonda, K. Imamura, R. Sugizaki, Y. Kawaguchi, and T. Tsuritani, "125 μm 5-core fibre with heterogeneous design suitable for migration from single-core system to multi-core system," in Eur. Conf. Opt. Commun. (ECOC), Dusseldorf, 2016, pp. 547-549), and Non-Patent Document 8, (Y. Sasaki et al., "Crosstalk-managed heterogeneous single-mode 32-core fibre," in Eur. Conf. Opt. Commun. (ECOC), 2016, pp. 550-552) has disclosed a heterogeneous core MCF. Designing (or prototype production) is performed on the condition that the effective cross-sectional area (Effective Area) or MFD is equalized between heterogeneous cores and that the cutoff wavelength is set to a certain value or less for all the cores. However, chromatic dispersion is disregarded. Unfortunately, however, with the core structures disclosed in Non-Patent Documents 6 to 8, it is difficult to equalize the chromatic dispersion characteristics between heterogeneous cores.

SUMMARY

The inventors found the following problems as a result of examinations on conventional MCFs. That is, as disclosed in the above Non-Patent Documents 1 to 8, an MCF has not yet been commercialized as a communication transmission medium even with vigorous studies in recent years. This is probably because the conventional MCF could not achieve both economic rationality and wide compatibility at the same time. Specifically, the conventional MCF has difficulty in simultaneously satisfying the following conditions (1) to (3). In addition, when assuming a short-distance interconnect as a transmission line that connects between electronic circuits or between a semiconductor chip and an electronic circuit to enable data communication, it is desired to develop an MCF that satisfies the following condition (4) included in the ITU-T G. 652 standards as well as satisfying the following conditions (1) to (3).

(1) Cladding outer diameter is 125 μm, or coating diameter is 250 μm or less.

(2) Presence of four or more cores whose centers are located on one straight line in the fiber cross section.

(3) Presence of MFD and a cutoff wavelength compatible with a standard single-mode optical fiber (hereinafter referred to as "SMF") conforming to the ITU-T G.652 standards at least in the O-band (1310 nm wavelength band frequently used in short-distance optical transmission, specifically a wavelength band of 1260 nm or more and 1360 nm or less).

(4) The zero-dispersion wavelength falls within the wavelength band of 24 nm width (preferably 1300 nm or more and 1324 nm or less).

Regarding the above condition (1), it is typically necessary to suppress overlap of electric field distributions of modes between cores in order to achieve an MCF that suppress inter-core XT. For this purpose, it is necessary to (a) give sufficient core spacing from each other, (b) sufficiently confine light within the core, or (c) achieve both of these conditions. In order to give sufficient core spacing from each other, it is necessary to increase the cladding outer diameter in a case where there is a large number of cores, or it is necessary to restrict the number of cores incorporated in the cladding to a certain number or less in a case where the cladding outer diameter is predetermined. In order to enhance the light confinement into the core, the MFD of each of cores must be reduced (to below the ITU-T G.652 standards). For this reason, in order to arrange a plurality of cores with MFD compatible with G.652 fibers in a cladding having a limited standard 125 µm outer diameter while suppressing the leakage loss on the outermost core, the number of cores that can be incorporated would be decreased.

The above-described condition (2) is based on a requirement to incorporate a larger number of cores in a cladding of the standard outer diameter of 125 µm using core arrangement of one-dimensional array capable of inexpensively implementing entry/exit of light on the MCF while suppressing degradation of optical characteristics. In addition, in order to suppress degradation of the optical characteristics, it is necessary to maintain the spacing between the adjacent cores and the distance from the outermost core to the coating at a certain level or more.

The condition (3) is an optical characteristic suitable for short-distance transmission. In long-haul transmission, it is necessary to suppress crosstalk with a shortest possible core spacing while achieving low loss, high chromatic dispersion, and large $A_{eff}$ in the C-band (1530 nm or more and 1565 nm or less). Therefore, the cable cutoff wavelength is set to significantly larger than 1260 nm (for example, 1300 nm or more, 1400 nm or more, or slightly smaller than 1530 nm). However, such an optical fiber is not suitable for short-distance transmission using an O-band (1260 nm or more and 1360 nm or less) capable of achieving low chromatic dispersion in a typical silica glass optical fiber. In addition, the optical fiber as described above does not necessarily have a low chromatic dispersion in the C-band unlike a dispersion-shifted fiber, and therefore has a large chromatic dispersion in an operation band in a single mode.

Regarding the above condition (4), it is known that XT can be effectively suppressed with the presence of a sufficient difference in the effective refractive index between adjacent cores. However, in order to have a sufficient difference in the effective refractive index between adjacent cores, it is necessary to have a large difference in refractive index profile between the cores. Therefore, it has been considered difficult to realize an MCF that achieves a sufficient effective refractive index difference between cores while maintaining optical characteristics compatible with standard SMFs in all of MFD, cutoff wavelength, and chromatic dispersion.

The present disclosure has been made in order to solve the problems as described above, and aims to provide an MCF having a structure for simultaneously achieving excellent economic rationality and high compatibility in short-distance optical transmission.

A multi-core optical fiber (MCF) of the present disclosure includes a plurality of core portions extending along a central axis of the MCF, a common cladding, and a resin coating. Each of the plurality of core portions includes: a core extending along the central axis; an inner cladding surrounding an outer periphery of the core; and a trench layer surrounding an outer peripheral surface of the inner cladding. The common cladding surrounds an outer peripheral surface of the trench layer of each of the plurality of core portions and has an outer diameter of 124 pin or more and 181 µm or less. The resin coating surrounds the outer peripheral surface of the common cladding and has an outer diameter of 195 µm or more and 250 µm or less. Furthermore, the multi-core optical fiber of the present disclosure includes a linear array group constituted by at least four core portions each of which has a core center located on a straight line defined on a cross section of the MCF, which is orthogonal to a central axis. Each of the four core portions constituting the linear array group has a refractive index profile in which at least a relative refractive index difference between the core and the inner cladding is equal to the others. Furthermore, the four core portions include a first core portion and a second core portion adjacent to each other and having a spacing Λ [µm] between individual core centers, the relative refractive index differences of the first core portion and a second core portion with respect to the refractive index of the common cladding differs by 0.001Λ [%] or more.

BRIEF DESCRIPTION OF THE DRAWINGS

FIG. 6 is a table illustrating structural parameters of a plurality of prepared samples;

FIG. 7 is a table illustrating measurement results of each of the samples illustrated in FIG. 6.

DETAILED DESCRIPTION

Figure 1:
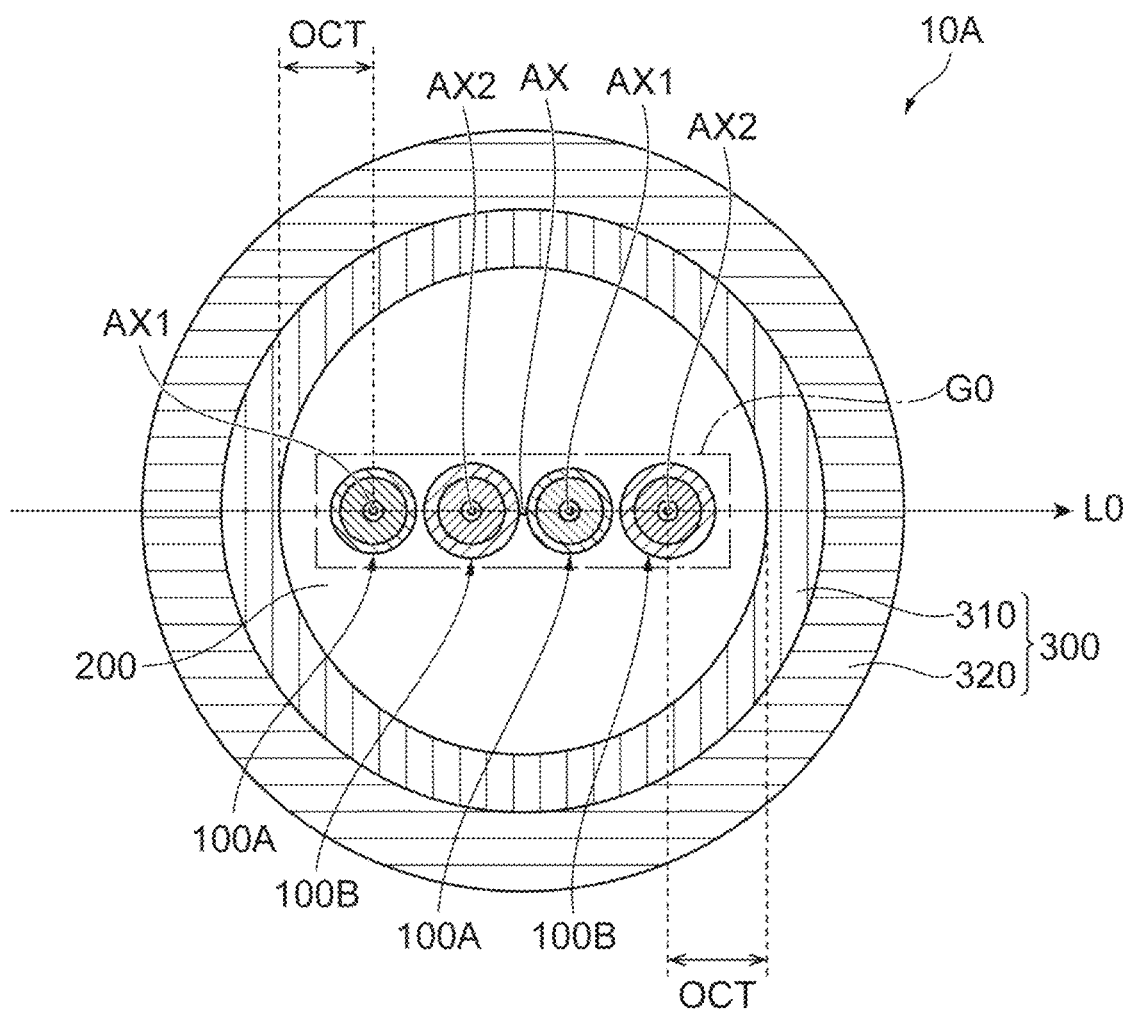
FIG. 1 is a view illustrating a cross-sectional structure of an MCF according to a first embodiment of the present disclosure.

First, in order to confirm the structural conditions required for the multi-core optical fiber (MCF) of the present disclosure, the MCFs described in the above-described Non-patent Documents 1 to 8 will be examined in further detail. As described above, an MCF has been actively studied in recent years, but has not yet been commercialized as a transmission medium for communication because of difficulty in simultaneously satisfying economic rationality and wide compatibility. In order to increase the economic rationality of the MCF, it is desirable that the outer diameter of the cladding of the MCF be 125 µm, which is equivalent to that of a conventional standardized optical fiber, and that the number of cores be at least four or more.

Each of the above-described Non-Patent Documents 1 and 2 proposes an MCF in which a plurality of cores is incorporated in a cladding having an outer diameter of 125 µm in a state of being arranged two-dimensionally in a fiber cross section in order to achieve an MCF incorporating more cores while maintaining optical characteristics suitable for communication. However, the MCF including the cores two-dimensionally arranged as described above needs a three-dimensional core array conversion device for fan-in/fan-out at the time of connecting to the SMF. The "three-dimensional core array conversion device" is a device in which cores are wired three-dimensionally, and is a device that converts an MCF core arrangement into a core array such as a corresponding SMF array or SMF bundle. An optical transceiver uses a semiconductor substrate or the like of an optical integrated circuit in silicon photonics. As an example, in a case where light entry/exit (edge coupling) is performed in a plurality of channels from an edge of the semiconductor substrate in parallel to the substrate plane, it is necessary to perform light entry/exit of these channels from the cores one-dimensionally arranged at the edge of the substrate to the cores of the MCF which is two-dimensionally arranged, and in this case, a three-dimensional core array conversion device would also be required. In addition, a three-dimensional core array conversion device is also required to connect MCFs having different core arrays. Unfortunately, however, such a three-dimensional core array conversion device is difficult to mass-produce and is very expensive at present, so as to be an obstacle to practical use of the MCF.

The above-described Non-Patent Document 3 has disclosed an MCF in which all four cores are arranged in a line. The use of the MCF would facilitate edge coupling with the silicon photonics substrate. Specifically, the MCF has a cladding outer diameter that is much larger than 125 µm, thereby realizing both suppression of inter-core XT and good optical characteristics in individual cores. Unfortunately, however, an optical fiber whose cladding outer diameter greatly exceeds the standard outer diameter (125 µm) would increase the manufacturing cost of the optical fiber itself. In addition, it would be difficult to use products with standard dimensions as connecting parts (connector ferrules or V-groove substrates for arrays). This would also increase the cost of these connecting parts, leading to impairment of economic rationality of the MCF.

The above-described Non-Patent Document 4 has disclosed an MCF in which the cladding outer diameter is a standard 125 µm and all the cores are arranged in a line. Unfortunately, however, the number of cores is only two, leading to low benefit of using MCF to the increase in the number of spatial channels per optical fiber (low economic rationality).

The above-described Non-Patent Document 5 has disclosed an MCF in which the cladding outer diameter is a standard 125 µm and all four cores are arranged in a line. Unfortunately, however, in the MCF, the cores are strongly coupled to each other, resulting in extremely high inter-core XT. That is, the MCF cannot allow each of the cores to be used as an independent spatial channel. When four cores are regarded as one waveguide, four spatial modes referred to as supermodes are independently used as waveguides, in which it would not be easy to create a device that individually inputs and outputs signals to each of the supermodes. Therefore, the MCF of Non-Patent Document 5 also impairs the economic rationality of the optical fiber transmission system using the MCF.

Each of Non-Patent Documents 6 to 8 has disclosed a heterogeneous core MCF in which the refractive index profile differs in each of cores. By employing a heterogeneous core structure, a large difference in propagation constant (or effective refractive index) occurs between cores, suppressing phase matching between cores (suppressing XT). On the other hand, it is not easy to make the difference in effective refractive index between the cores large enough to suppress XT. That is, various optical characteristics would have a difference between the cores, resulting in occurrence of a difference also in the transmission quality of signal light between the cores. Note that the MCF of each of Non-Patent Documents 6 to 8 is mainly focused on application to long-haul optical transmission, and thus, the effective cross-sectional area (determined by the electric field distribution of the propagation light) being an important parameter in the long-haul optical transmission is equalized and the cutoff wavelength is set to a fixed value or less for all cores, thereby ensuring single mode operation in the wavelength band used. On the other hand, chromatic dispersion is disregarded in long-haul optical transmission (because it can be compensated by digital signal processing). The disclosed core structure is considered to have difficulty in equalizing chromatic dispersion characteristics between heterogeneous cores.

At present, it is extremely difficult to equalize not merely the effective cross-sectional area and MFD determined by the electric field distribution of the propagating light between heterogeneous cores but also the chromatic dispersion between heterogeneous cores. In addition, it has been impractical to achieve propagation constants different between the cores while sufficiently enhancing confinement of light within the cores to suppress the inter-core XT.

An inter-core (or inter-mode) power coupling coefficient per fiber length can be obtained as follows. As a precondition, the MCF has two cores (modes) and transmission loss in the MCF is negligible. The power coupling coefficient between one core (mode) m and the other core (mode) n is h, the light intensity in one core (mode) m is $I_m$, and the light intensity in the other core (mode) n is $I_n$, and the position in the fiber longitudinal direction is z. Under these, a relationship represented by the following Formula (1) holds:

$$\begin{cases} \dfrac{dI_n}{dz} = h(I_m - I_n) \\ \dfrac{dI_m}{dz} = h(I_n - I_m) \end{cases} \qquad (1)$$

When light is incident only on one core (mode) m located on one end of the MCF when the crosstalk or power coupling between the two cores is sufficiently small and when the output light intensity at the other end of the MCF from one core (mode) m is $I_1$, the output light intensity from the other core (mode) n is $I_2$, and the MCF length is $L_z$, the power coupling coefficient h between the one core (mode) m and the other core (mode) n can be obtained by the following Formula (2):

$$h \approx \frac{I_2/I_1}{L_z}. \quad (2)$$

In particular, assuming application to short-distance interconnects, it is desirable to perform optical transmission with low power consumption by minimizing compensation for signal waveform distortion due to signal processing. At this time, it is desired that the chromatic dispersion (absolute value) is sufficiently suppressed in the wavelength band in use, with small variation between the cores. The ITU-T G.652 standards specify that the zero-dispersion wavelength is to be in the range of 1300 nm or more and 1324 nm or less so as to reduce the absolute value of chromatic dispersion in the 1310 nm band (1260 nm or more and 1360 nm or less), which is often used for short-distance optical transmission. This leads to structural conditions:

(1) Being a heterogeneous core MCF with a propagation constant difference that can sufficiently suppress inter-core XT; and (2) At a wavelength of 1310 nm used for short-distance optical transmission, the MFDs of all cores fall within the range of 8.6±0.6 pin to 9.5±0.6 pin, the cable cutoff wavelength is 1260 nm or less, and the zero-dispersion wavelength falls within the wavelength band of 24 nm width (more preferably within the range of 1300 nm or more and 1324 nm or less).

Unfortunately, however, MCFs satisfying the above-described specifications have not been disclosed so far, and achieving this is clearly difficult as indicated in the background Documents as technical common knowledge in those skilled in the art.

Description of Embodiments of Present Disclosure

Based on the above detailed examination results, the present disclosure proposes an MCF suitable for short-distance optical transmission in which a large number of cores, namely four or more cores (including at least four cores arranged in a line in a fiber cross section) are incorporated in a cladding having an outer diameter of 124 pin or more and 181 μm or less. Note that the MCF of the present disclosure is focused on short-distance optical transmission using the O-band (1260 nm or more and 1360 nm or less), and thus tolerates optical characteristic degradation that occurs only in long-haul optical transmission using the C-band or the like. In addition, the MCF of the present disclosure allows adjacent cores to have different refractive index profiles and thereby achieving optical characteristics sufficiently suitable for short-haul optical transmission using the O-band for signal transmission.

More specifically, an example of the MCF of the present disclosure achieves the required characteristics of the MFD, the cutoff wavelength, and the chromatic dispersion described above. Furthermore, the MCF according to one example has a configuration in which a standard cladding outer diameter of 125±1 μm, and four or more cores are arranged in a line in a fiber cross section, making the MCF suitable for short-haul optical transmission in a wavelength of 1310 nm band.

Moreover, another example of the MCF of the present disclosure also achieves the required characteristics of the MFD, the cutoff wavelength, and the chromatic dispersion described above. Furthermore, the MCF according to the other example has a standard cladding outer diameter of 180 μm or less, and 12 or more cores are arranged in a square lattice in a fiber cross section, making the MCF suitable for short-haul optical transmission at a wavelength of 1260 nm or more and 1625 nm or less.

Hereinafter, the specifics of the embodiments of the present disclosure will be listed and described individually.

(1) A multi-core optical fiber (MCF) according to one aspect of the present disclosure includes a plurality of core portions extending along a central axis of the MCF, a common cladding, and a resin coating. Each of the plurality of core portions includes: a core extending along the central axis; an inner cladding surrounding an outer periphery of the core; and a trench layer surrounding an outer peripheral surface of the inner cladding. In this manner, each of the plurality of core portions has a trench-assisted structure having a high light confinement effect. In consideration of matching with the cladding outer diameter of a standard SMF, the common cladding surrounds the outer peripheral surface of the trench layer of each of the plurality of core portions and has an outer diameter of 124 μm or more and 181 μm or less. The resin coating surrounds the outer peripheral surface of the common cladding and has an outer diameter of 195 μm or more and 250 μm or less. Furthermore, the multi-core optical fiber of the present disclosure includes a linear array group constituted by at least four core portions each of which has a core center located on a straight line defined on a cross section of the MCF, which is orthogonal to a central axis. Each of the four core portions constituting the linear array group has a refractive index profile in which at least a relative refractive index difference between the core and the inner cladding is equal to the others. Furthermore, the four core portions include a first core portion and a second core portion adjacent to each other and having a spacing Λ [μm] between individual core centers, the relative refractive index differences of the first core portion and a second core portion with respect to the refractive index of the common cladding differs by 0.001 Λ [%] or more. That is, the first core portion and the second core portion adjacent to each other have mutually different structures. Furthermore, as an example, in a case where the linear array group includes four core portions, a core portion corresponding to the above-described first core portion and a core portion corresponding to the above-described second core portion are alternately arranged along the straight line. Here, "the refractive index profile in which the relative refractive index difference is equal between the core and the inner cladding" means a refractive index profile in which the difference in the relative refractive index differences of the core and the inner cladding is 0.02% or less.

(2) As one aspect of the present disclosure, it is preferable that the MCF has equalized optical characteristics for all the core portions in the 1310 nm wavelength band (1260 nm to 1360 nm). Specifically, it is preferable to have a configuration in which at least each of the four core portions has an MFD of 8.0 μm or more and 10.1 μm or less at a wavelength of 1310 nm, a cable cutoff wavelength of 1260 nm or less, and a transmission loss of 0.5 dB/km or less in a 1310 nm wavelength band. The transmission loss in the 1310 nm wavelength band is more preferably 0.4 dB/km or less. In this case, the leakage loss LL to the resin coating is sufficiently low near the wavelength of 1310 nm. Regarding the variation in the zero-dispersion wavelengths of the four core portions, the difference between the maximum zero-dispersion wavelength and the minimum zero-dispersion wavelength is preferably 24 nm or less. Moreover, in a state where the MCF is bent at a radius of 7 cm or more and 14 cm or less or a radius of 14 cm or more and 20 cm or less, crosstalk between the core in the first core portion and the core in the second core portion (inter-core XT) is preferably 0.01/km or less. Such an XT value is sufficiently low as the XT between adjacent cores in short-haul optical transmission.

(3) As one aspect of the present disclosure, as structural parameters of the first core portion, the relative refractive index differences of the core, the inner cladding and the trench layer with respect to the refractive index of the common cladding are respectively set to $\Delta_{co,1}$ [%], $\Delta_{ic,1}$ [%], and $\Delta_{t,1}$ [%]. In contrast, as the structural parameters of the second core portion, the relative refractive index differences of the core, the inner cladding and the trench layer with respect to the refractive index of the common cladding are respectively set to $\Delta_{co,2}$ [%], $\Delta_{ic,2}$ [%], and $\Delta_{t,2}$ [%]. At this time, it is preferable that the first core portion and the second core portion satisfy the following relationship:

$\Delta_{co,1} > \Delta_{ic,1} > \Delta_{t,1}$ $\Delta_{co,2} > \Delta_{ic,2} > \Delta_{t,2}$ $0.32\% \leq \Delta_{co,1} - \Delta_{ic,1} \leq 0.40\%$ $0.32\% \leq \Delta_{co,2} - \Delta_{ic,2} \leq 0.40\%$ $\Delta_{t,1} \leq 0\%$ $\Delta_{t,2} < 0\%$ $\Delta_{ic,1} \leq 0.10\%$ $-0.10\% \leq \Delta_{ic,2}$.

It is more preferable to satisfy the following:

$\Delta_{ic,2} < 0\% < \Delta_{ic,1}$.

In addition, the following are the arrangement conditions for the first core portion and the second core portion in order to ensure suppression of inter-core XT and suppression of the leakage loss LL to the resin coating side. That is, in the condition that $\Lambda$ [μm] is defined as a spacing between the core center of the first core portion and the core center of the second core portion, it is preferable that the first core portion and the second core portion satisfy the following relationship:

$0.001\Lambda \leq \Delta_{co,1} - \Delta_{co,2}$ $0.001\Lambda \leq \Delta_{ic,1} - \Delta_{ic,2}$.

In addition, as one aspect of the present disclosure, the first core portion and the second core portion may satisfy the following relationship:

$0.002\Lambda \leq \Delta_{co,1} - \Delta_{co,2}$ $0.002\Lambda \leq \Delta_{ic,1} - \Delta_{ic,2}$.

Between adjacent first and second core portions, their individual trench layers may be in contact (or may be connected) with each other.

(4) As one aspect of the present disclosure, the first core portion and the second core portion may satisfy the following relationship:

$\Delta_{t,1} \leq -0.5\%$ $\Delta_{t,2} \leq -0.5\%$ $0.34 \leq a_1/b_1 \leq 0.42$ $0.34 \leq a_2/b_2 \leq 0.42$, where as the structural parameters of the first core portion, the outer diameters of the core, the inner cladding, and the trench layer are respectively set to $2a_1$ [μm], $2b_1$ [μm], and $2c_1$ [μm], and as the structural parameters of the second core portion, the outer diameters of the core, the inner cladding, and the trench layer are respectively set to $2a_2$ [μm], $2b_2$ [μm], and $2c_2$ [μm].

(5) As one aspect of the present disclosure, it is preferable that the MCF has a zero-dispersion wavelength of 1300 nm or more and 1324 nm or less. As one aspect of the present disclosure, it is preferable that the MCF has a dispersion slope of 0.092 ps/(nm²·km) or less at a zero-dispersion wavelength. As one aspect of the present disclosure, it is preferable that the MCF has a bending loss of 0.25 dB/turn or less at the wavelength of 1310 nm under a bend having a radius of curvature of 5 mm or more, or under a bend having a radius of curvature of 3 mm or more. Furthermore, as one aspect of the present disclosure, it is preferable that the common cladding has an outer diameter of 124 μm or more and 126 μm or less. At this time, it is preferable that the spacing $\Lambda$ [μm] between the core center of the first core portion and the core center of the second core portion satisfies the condition:

22.5 μm ≤ $\Lambda$ ≤ 27.8 μm.

Furthermore, the spacing $\Lambda$ [μm] may satisfy the condition:

23 μm ≤ $\Lambda$ ≤ 25 μm.

(6) As one aspect of the present disclosure, the shortest distance between an outer peripheral surface of the trench layer of the first core portion and an outer peripheral surface of the trench layer of the second core portion is set to the spacing w [μm], or a value given by an expression "$\Lambda - (c_1 + c_2)$" is defined as the spacing w [μm]. At this time, it is preferable that the spacing w [μm] and the spacing $\Lambda$ [μm] satisfy the following relationship:

0 μm ≤ w ≤ 2.49 μm $0.0133w^3 - 0.129w^2 + 0.885w + 22.5 \leq \Lambda \leq -1.46w + 27.8$.

Moreover, deviation d [μm] between a midpoint of a first line segment connecting the outer peripheral surfaces of the trench layers of the first and second core portions at the shortest distance and a midpoint of a second line segment connecting the core centers of the first and second core portions will be given the following Formula (3):

$$d = \left(c_1 + \frac{w}{2}\right) - \frac{\Lambda}{2}. \quad (3)$$

At this time, it is preferable that the deviation d [μm] satisfies the following relationship:

$d \leq -(0.104w + 0.324)\Lambda^2 + (5.721w + 19.220)\Lambda - (79.360w + 271.139)$ $d \leq -0.246\Lambda - 0.501w + 6.471$ $d \geq 0.439\Lambda + 0.501w - 12.539$.

Note that in a case where the midpoint of the first line segment is located closer to the first core portion than the midpoint of the second line segment in the positional relationship between the first core portion and the second core portion, the deviation d [μm] will be a negative value.

(7) As one aspect of the present disclosure, it is preferable that the plurality of core portions including the above-described linear array group is arranged, on a cross section of the MCF, such that positions of core centers are in line symmetry with respect to a reference straight line passing through an intersection between the central axis (the central axis of the MCF) and the cross section, as a symmetry axis. As one aspect of the present embodiment, it is allowable that the plurality of core portions including the above-described linear array group is arranged, on a cross section of the MCF, such that positions of individual core center have two-fold or more rotational symmetry with respect to an intersection between the central axis (the central axis of the MCF) and the cross section, as a rotational center. As one aspect of the present disclosure, the MCF may include a marker having a refractive index different from the refractive index of the common cladding. In this case, the marker is arranged at a position that cancels the symmetry (line symmetry, rotational symmetry, or the like) of the core center position in the plurality of core portions. The presence of such a marker enables distinction between the first and second core portions. Furthermore, as one aspect of the present disclosure, an outer radius ($c_1$) of the trench layer in the first core portion may be different from an outer radius ($c_2$) of the trench layer in the second core portion. Also in this case, the refractive index profile of the MCF along the array direction of the four core portions has lost symmetry (line symmetry, rotational symmetry, or the like) of the refractive index profile on a cross section of the MCF, which enables distinction between the first and second core portions.

As described above, each aspect listed in [Description of embodiments of present disclosure] is applicable to all of the remaining aspects or to all combinations of these remaining aspects.

Details of Embodiments of Present Disclosure

A specific example of a multi-core optical fiber (MCF) according to the present disclosure will be described below in detail with reference to the accompanying drawings. It is to be understood that the present disclosure is not limited to these examples, but is to be indicated by the scope of the claims, and it is intended to include meanings equivalent to the claims and all modifications within the scope. The same reference signs are given to same components and duplicate descriptions will be omitted.

First Embodiment

Figure 2:
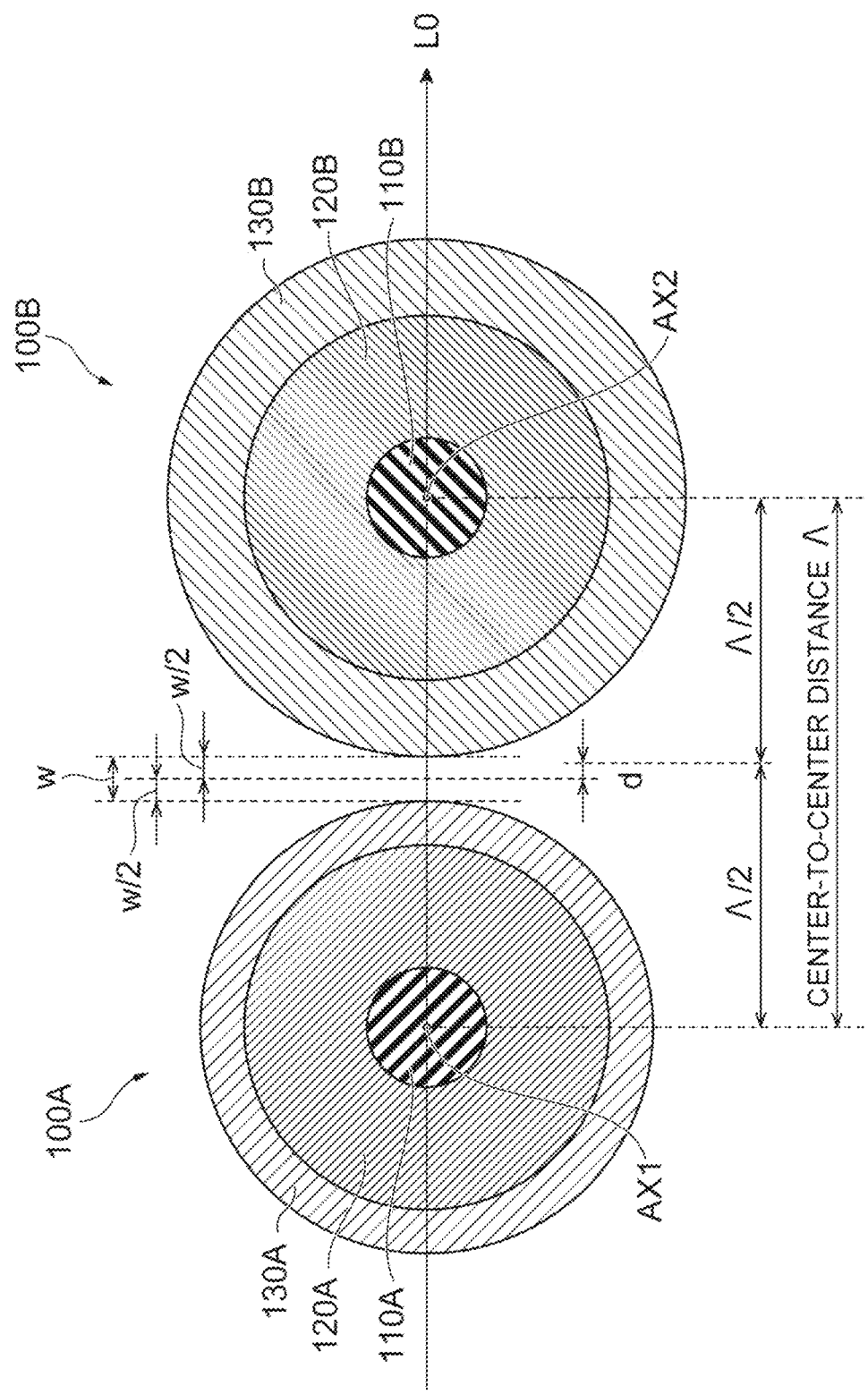
FIG. 2 is a view illustrating a cross-sectional structure and an arrangement relationship between a first core portion and a second core portion adjacent to each other.
Figure 3:
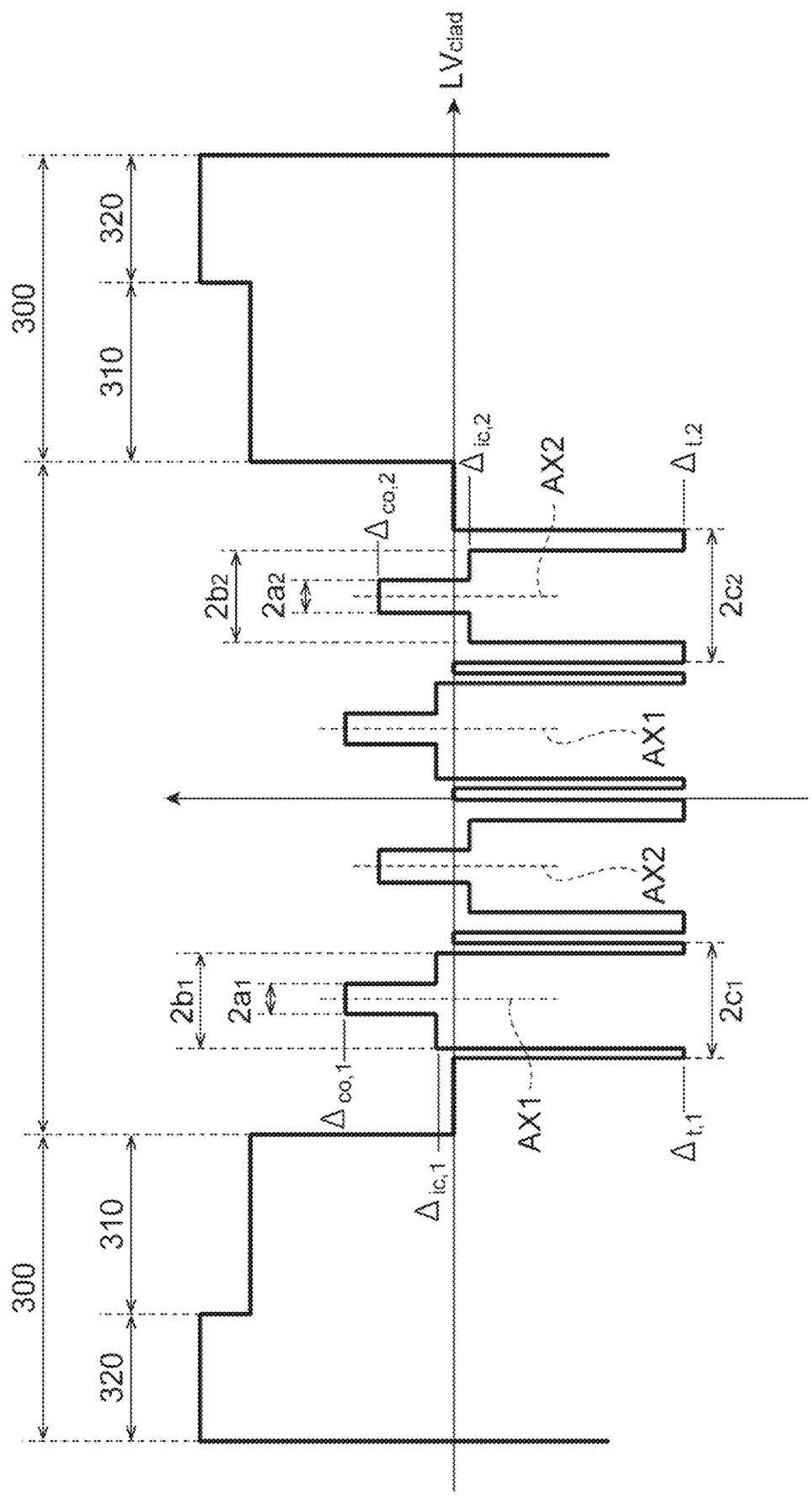
FIG. 3 is a refractive index profile of the MCF along a straight line in FIG. 1.

FIG. 1 is a view illustrating a cross-sectional structure of an MCF according to a first embodiment of the present disclosure. FIG. 2 is a view illustrating a cross-sectional structure and an arrangement relationship of a first core portion 100A and a second core portion 100B which are part of the four core portions (a linear array group G0) illustrated in FIG. 1 and are adjacent to each other. FIG. 3 is a refractive index profile of the MCF along a straight line L0 in FIG. 1. Note that FIG. 3 illustrates a refractive index level $LV_{clad}$ of a common cladding 200.

In the example illustrated in FIG. 1, the MCF 10A of the first embodiment includes: four core portions each extending along a central axis AX of the MCF 10A, a common cladding 200 surrounding each of the four core portions; and a resin coating 300 surrounding an outer peripheral surface of the common cladding 200. The four core portions has a configuration including two types of core portions having different structures (first core portions 100A and second core portions 100B), in which these first core portions 100A and second core portions 100B are alternately arranged along the straight line L0. That is, a core center AX1 of the first core portion 100A and a core center AX2 of the second core portion 100B are both located on the straight line L0. In this manner, at least four core portions (first core portion 100A and second core portion 100B) including the core centers AX1 and AX2 arranged on the straight line L0 constitute the linear array group G0.

The common cladding 200 has an outer diameter of 124 μm or more and 181 μm or less. In addition, in order to suppress the increase of the leakage loss LL from individual core portions to the resin coating 300, an Outer Cladding Thickness (OCT) is set so as to determine an appropriate position of the linear array group G0 in the cross section of the common cladding 200. In the present specification, "OCT" is the shortest distance from the core center of the core portion farthest from the central axis AX to the outer peripheral surface of the common cladding 200. The resin coating provided on the outer periphery of the common cladding 200 has an outer diameter of 195 μm or more and 250 μm or less. Note that the resin coating 300 does not need to be comprised of a single layer. In the example of FIG. 1, the resin coating 300 includes: an inner coating 310 surrounding the outer peripheral surface of the common cladding 200; and an outer coating 320 surrounding the outer peripheral surface of the inner coating 310. In consideration of the matching with the cladding outer diameter of a standard SMF, the outer diameter of the common cladding 200 is desirably 124 μm to 126 μm. At this time, the outer diameter of the resin coating 300 can be desirably reduced to a minimum of 195 μm because this range can be realized without impairing optical characteristics and productivity. Still, in consideration of the matching with the resin coating outer diameter of a standard SMF, it is further desirable that the outer diameter of the resin coating 300 be approximately 250 μm. At this time, the outer diameter of the common cladding 200 is desirably set to a maximum of 179 μm to 181 μm because this range can be realized without impairing optical characteristics and productivity.

FIG. 2 illustrates an example of a cross-sectional structure and an arrangement relationship between the first core portion 100A and the second core portion 100B which are part of the four core portions illustrated in FIG. 1 and are adjacent to each other. As illustrated in FIG. 2, the first core portion 100A has a trench-assisted structure. The trench-assisted structure includes: a core 110A having an outer diameter $2a_1$ and including a core center AX1; an inner cladding 120A having an outer diameter $2b_1$ and having a refractive index lower than the refractive index of the core 110A; and a trench layer 130A having an outer diameter $2c_1$ and having a refractive index lower than the refractive index of the inner cladding 120A. In contrast, the second core portion 100B has a trench-assisted structure. The trench-assisted structure includes: a core 110B having an outer diameter $2a_2$ and including a core center AX2; an inner cladding 120B having an outer diameter $2b_2$ and having a refractive index lower than the refractive index of the core 110B, and a trench layer 130B having an outer diameter $2c_2$ and having a refractive index lower than the refractive index of the inner cladding 120B. The outer radius ($c_1$) of the trench layer 130A in the first core portion 100A may be different from the outer radius ($c_2$) of the trench layer 130B in the second core portion 100B. Furthermore, these adjacent trench layers 130A and 130B may overlap each other.

Furthermore, as illustrated in FIG. 2, the positional relationship between the first core portion 100A and second core portion 100B adjacent to each other is determined by the shortest distance w [μm] between trench layers 130A and 130B and by the spacing Λ [μm], which is a center-to-center distance between the core center AX1 and the core center AX2. Specifically, in a case where the common cladding 200 has an outer diameter of 124 μm or more and 126 μm or less, the spacing Λ [μm] satisfies one of the conditions:

22.5 μm≤Λ≤27.8 μm or

23 μm≤Λ≤25 μm.

Furthermore, in the condition that a spacing w [μm] is defined as the shortest distance between the outer peripheral surface of the trench layer 130A of the first core portion 100A and the outer peripheral surface of the trench layer 130B of the second core portion 100B, or defined as the value given by the expression "Λ−($c_1$+$c_2$)", the spacing w [μm] and the spacing Λ [μm] satisfy the following relationship:

0 μm≤w≤2.49 μm $0.0133w^3 − 0.129w^2 + 0.885w + 22.5 ≤ Λ ≤ −1.46w + 27.8.$

In addition, the first line segment is a line segment connecting the outer peripheral surfaces of the trench layers 130A and 130B of the first and second core portions 100A and 100B with the shortest distance, the second line segment is a line segment connecting the core centers AX1 and AX2 of the first and second core portions 100A and 100B, the deviation d [μm] between the midpoint of the first line segment and the midpoint of the second line segment is given by the above Formula (3), and the deviation d [μm] satisfies the following relationship:

$d ≤ −(0.104w+0.324)Λ^2 + (5.721w+19.220)Λ − (79.360w+271.139)$ $d ≤ −0.246Λ − 0.501w + 6.471$ $d ≥ 0.439Λ + 0.501w − 12.539.$

Note that in a case where the midpoint of the first line segment is located closer to the first core portion than the midpoint of the second line segment in the positional relationship between the first core portion and the second core portion, the deviation d [μm] will be a negative value.

FIG. 3 illustrates a refractive index profile along the straight line L0 of the MCF 10A (refer to FIGS. 1 and 2), particularly a refractive index profile of the linear array group G0 in which the first core portion 100A (including the core center AX1) and the second core portion 100B (including the core center AX2) are alternately arranged, in the cross section of the MCF 10A according to the first embodiment. As illustrated in FIG. 3, the outer diameters of the core 110A, the inner cladding 120A, and the trench layer 130A constituting the first core portion 100A are respectively $2a_1$ [μm], $2b_1$ [μm], and $2c_1$ [μm]. Furthermore, the relative refractive index differences of the core 110A, the inner cladding 120A, and the trench layer 130A constituting the first core portion 100A (the relative refractive index differences Δ with respect to the refractive index of the common cladding 200, with illustration of the refractive index levels $LV_{clad}$ of the common cladding 200 in FIG. 3) are respectively $Δ_{0,1}$ [%], $Δ_{ic,1}$ [%], and $Δ_{t,1}$ [%]. The outer diameters of the core 110B, the inner cladding 120B, and the trench layer 130B constituting the second core portion 100B are respectively $2a_2$ [μm], $2b_2$ [μm], and $2c_2$ [μm]. Furthermore, the relative refractive index differences of the core 110B, the inner cladding 120B, and the trench layer 130B constituting the second core portion 100B (the relative refractive index differences Δ with respect to the refractive index of the common cladding 200) are respectively $Δ_{co,2}$ [%], $Δ_{ic,2}$ [%] and $Δ_{t,2}$ [%].

In the present specification, the relative refractive index difference Δ [%] of a certain glass region having a refractive index $n_1$ (for example, the core 110A, 110B, or the like) with respect to a refractive index $n_0$ of the common cladding 200 is given by the expression:

$Δ = 100(n_1^2 − n_0^2)/2n_0^2.$

Therefore, the relative refractive index difference of the glass region having a refractive index higher than the refractive index of the common cladding 200 will be a positive value, while the relative refractive index difference of the glass region having a refractive index lower than the refractive index of the common cladding 200 will be a negative value. Furthermore, the relative refractive index difference between any glass regions other than the common cladding 200 is to be given by an absolute value of a difference between the relative refractive index difference of one glass region with respect to the refractive index of the common cladding 200 and the refractive refractive index difference of the other glass region with respect to the refractive index of the common cladding 200.

As illustrated in FIG. 3, the refractive index profile of each of the four core portions constituting the linear array group G0 is designed such that at least a relative refractive index difference ($Δ_{co,1} − Δ_{ic,1}$) in the core portion corresponding to the first core portion 100A substantially matches a relative refractive index difference ($Δ_{co,2} − Δ_{ic,2}$) in the core portion corresponding to the second core portion 100B. In particular, the refractive index profile of the first core portion 100A including the core center AX1 is set such that the refractive index of the inner cladding 120A is higher than the refractive index of the common cladding 200. In contrast, the refractive index profile of the second core portion 100B including the core center AX2 is set such that the refractive index of the inner cladding 120B is lower than the refractive index of the common cladding 200 (the magnitude relationship is reversed from the case of the first core portion 100A). Alternately arranging the first core portions 100A and the second core portions 100B having such different refractive index profiles along the straight line L0 realizes an offset structure of the refractive index profile.

More specifically, comparing the structure of the refractive index profile of the first core portion 100A and the structure of the refractive index profile of the second core portion 100B, the first core portion 100A and the second core portion 100B in the present embodiment satisfy the following relationship:

$Δ_{co,1} > Δ_{ic,1} > Δ_{t,1}$ $Δ_{co,2} > Δ_{ic,2} > Δ_{t,2}$ $0.32\% ≤ Δ_{co,1} − Δ_{ic,1} ≤ 0.40\%$ $0.32\% ≤ Δ_{co,2} − Δ_{ic,2} ≤ 0.40\%$ $Δ_{t,1} ≤ 0\%$ $Δ_{t,2} < 0\%$ $Δ_{ic,1} ≤ 0.10\%$ $−0.10\% ≤ Δ_{ic,2}.$

It is more preferable to satisfy the following:

$\Delta_{ic,2} < 0\% < \Delta_{ic,1}$.

Furthermore, the first core portion 100A and the second core portion 100B satisfy the following relationship:

$0.001\Delta \leq \Delta_{co,1} - \Delta_{co,2}$ $0.001\ \Delta \leq \Delta_{ic,1} - \Delta_{ic,2}$ or $0.002\Delta \leq \Delta_{co,1} - \Delta_{co,2}$ $0.002\ \Delta \leq \Delta_{ic,1} - \Delta_{ic,2}$.

Furthermore, it is preferable that the first core portion 100A and the second core portion 100B satisfy the following relationship:

$\Delta_{t,1} \leq -0.5\%$ $\Delta_{t,2} \leq -0.5\%$ $0.34 \leq a_1/b_1 \leq 0.42$ $0.34 \leq a_2/b_2 \leq 0.42$.

Second Embodiment

Figure 4:
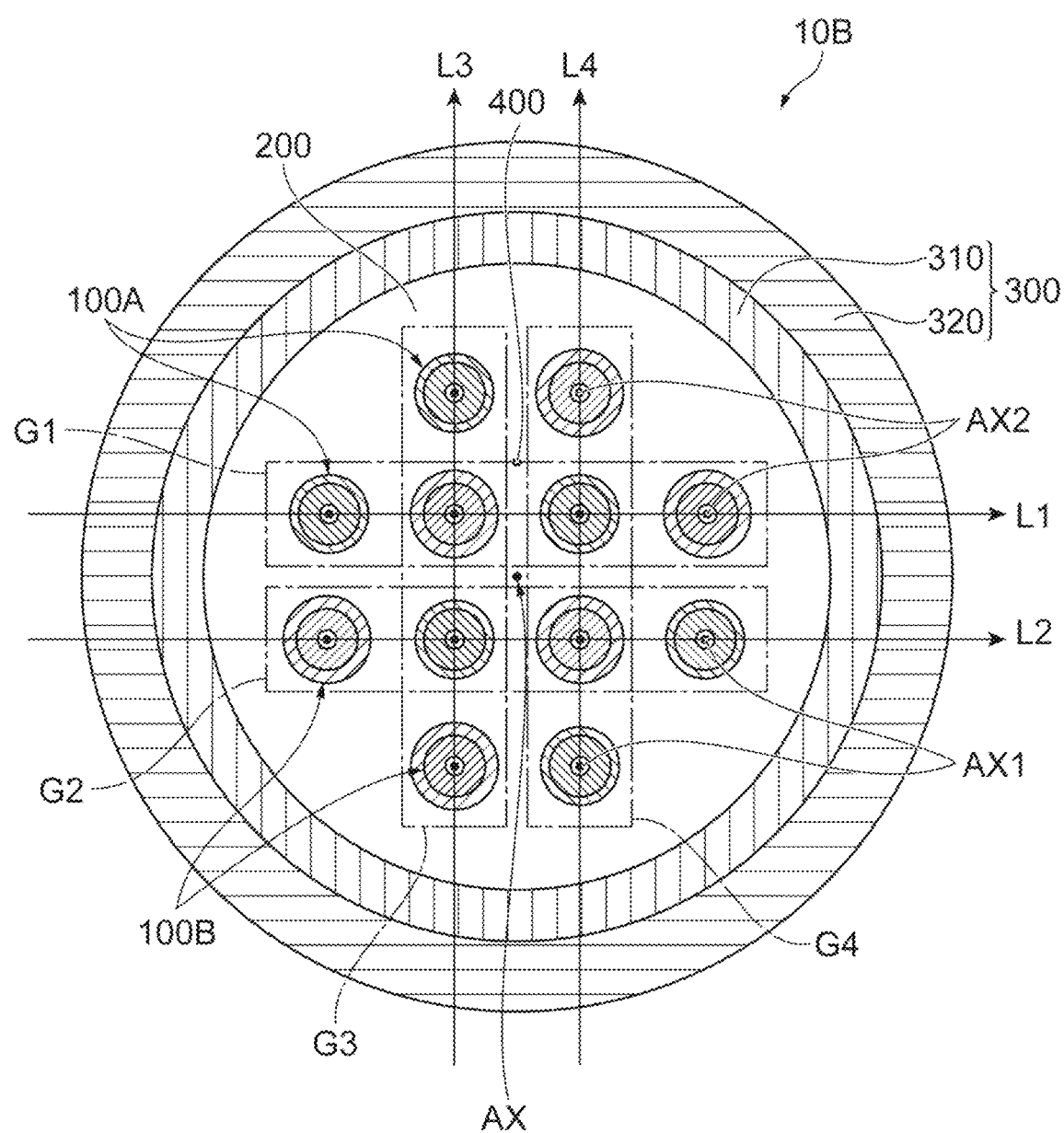
FIG. 4 is a view illustrating a cross-sectional structure of an MCF according to a second embodiment of the present disclosure.

FIG. 4 is a view illustrating a cross-sectional structure of an MCF according to a second embodiment of the present disclosure. Although the MCF 10B according to the second embodiment illustrated in FIG. 4 differs from the MCF 10A according to the above-described first embodiment in the number and array structure of the core portions provided in the common cladding 200, it is possible to obtain technical effects similar to the case of the MCF 10A according to the first embodiment.

The MCF 10B of the second embodiment illustrated in FIG. 4 includes: 12 core portions; a common cladding 200 surrounding each of the 12 core portions; and a resin coating 300 surrounding an outer peripheral surface of the common cladding 200. The resin coating 300 includes: an inner coating 310 surrounding the outer peripheral surface of the common cladding 200; and an outer coating 320 surrounding the outer peripheral surface of the inner coating 310. Note that the resin coating 300 may be comprised of a single layer. The 12 core portions include a group corresponding to the above-described first core portion 100A and a group corresponding to the above-described second core portion 100B, and are arranged to form a square lattice. In the second embodiment, the 12 core portions are arranged along four straight lines L1, L2, L3, and L4 on the cross section of the MCF 10B (a plane orthogonal to the central axis AX). The straight line L1 and the straight line L2 are parallel to each other, while the straight line L3 and the straight line L4 are also parallel to each other. The two straight lines L3 and L4 are orthogonal to the two straight lines L1 and L2.

On the straight line L1, the four core portions constituting a linear array group G1 are arranged such that the first core portions 100A and the second core portions 100B are alternately disposed. On the straight line L2, the four core portions constituting a linear array group G2 are arranged such that the first core portions 100A and the second core portions 100B are alternately disposed. On the straight line L3, the four core portions constituting a linear array group G3 are arranged such that the first core portions 100A and the second core portions 100B are alternately disposed. On the straight line L4, the four core portions constituting a linear array group G4 are arranged such that the first core portions 100A and the second core portions 100B are alternately disposed.

In the example illustrated in FIG. 4, the 12 core portions including the four linear array groups G1 to G4 are arranged such that positions of individual core centers AX1 and AX2 are in line symmetry with a reference straight line that intersects the central axis AX of the MCF 10B, as a symmetry axis. Furthermore, the 12 core portions are arranged such that the positions of the individual core centers AX1 and AX2 have two-fold or more rotational symmetry about the central axis AX of the MCF 10B, as a rotational center. In such a core portion arrangement having line symmetry or rotational symmetry, it is difficult to distinguish between the first core 100A and the second core 100B. To cope with this, in the second embodiment, a marker 400 having a refractive index different from the refractive index of the common cladding 200 is provided. The marker 400 is arranged at a position that cancels the symmetry of the arrangement of the core centers AX1 and AX2 in the 12 core portions. The marker 400 enables distinction between the first core portion 100A and the second core portion 100B.

Third Embodiment

Figure 5:
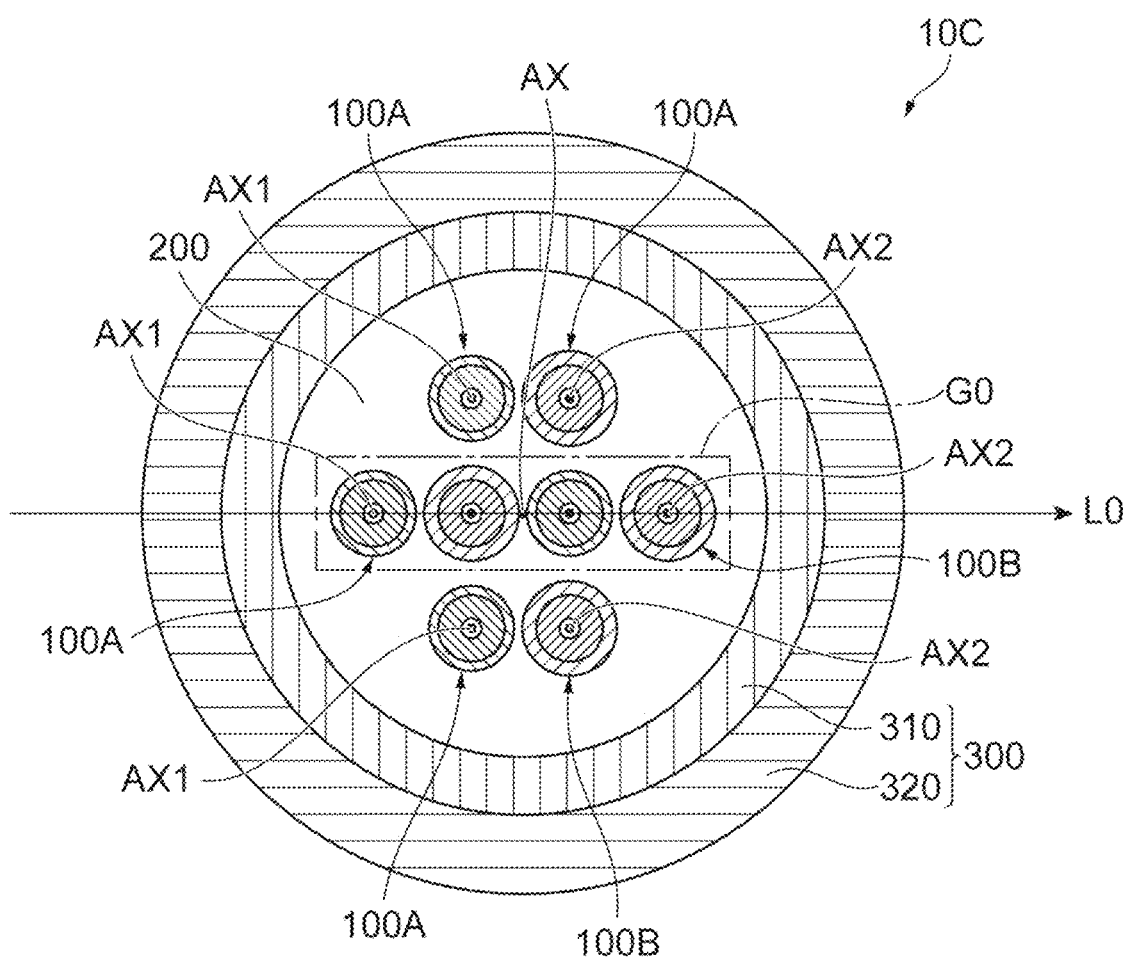
FIG. 5 is a view illustrating a cross-sectional structure of an MCF according to a third embodiment of the present disclosure.

FIG. 5 is a view illustrating a cross-sectional structure of an MCF according to a third embodiment of the present disclosure. Although the MCF 10C according to the third embodiment illustrated in FIG. 5 differs from the MCF 10A according to the above-described first embodiment in the number and array structure of the core portions provided in the common cladding 200, it is possible to obtain technical effects similar to the case of the MCF 10A according to the first embodiment.

The MCF 10C of the third embodiment illustrated in FIG. 5 includes: eight core portions; a common cladding 200 surrounding each of the eight core portions; and a resin coating 300 surrounding an outer peripheral surface of the common cladding 200. The resin coating 300 includes: an inner coating 310 surrounding the outer peripheral surface of the common cladding 200; and an outer coating 320 surrounding the outer peripheral surface of the inner coating 310. Note that the resin coating 300 may be comprised of a single layer. The eight core portions include a group corresponding to the above-described first core portion 100A and a group corresponding to the above-described second core portion 100B. In the third embodiment, four core portions are arranged along a straight line L0 (straight line intersecting the central axis AX of the MCF 10C) on the cross section of the MCF 10C (a plane orthogonal to the central axis AX). The array of the core portions on the straight line L0 is similar to that in the above-described first embodiment. That is, on the straight line L0, the four core portions constituting a linear array group G0 are arranged such that the first core portions 100A and the second core portions 100B are alternately disposed.

Furthermore, in the example illustrated in FIG. 5, the eight core portions including the linear array group G0 are arranged such that positions of individual core centers AX1 and AX2 are in line symmetry with a reference straight line that intersects the central axis AX of the MCF 10C, as a symmetry axis. Furthermore, the eight core portions are arranged such that the positions of the individual core centers AX1 and AX2 have two-fold or more rotational symmetry about the central axis AX of the MCF 10C, as a rotational center. Note that the marker 400 may be arranged in the third embodiment similarly to the case of the above-described second embodiment.

Measurement Result

FIG. 6 is a table illustrating structural parameters of a plurality of samples prepared for measurement. FIG. 7 is a table illustrating measurement results of each of the samples illustrated in FIG. 6.

Prepared sample #1 is a sample including the linear array group G0 (an array component in which four core portions are arranged in a line (series)), similarly to the first embodiment (FIG. 1), in which the outer diameter of the common cladding 200 (hereinafter simply referred to as "cladding outer diameter") is 125 μm. Similarly to the first embodiment (FIG. 1), sample #2 is a sample including the linear array group G0, and has a cladding outer diameter of 125 μm. Similarly to the first embodiment (FIG. 1), sample #3 is a sample including the linear array group G0, and has a cladding outer diameter of 125 μm. Sample #4 is a sample including four linear array groups G1 to G4 (array components in which 12 core portions are arranged to form a square lattice), similarly to the second embodiment (FIG. 4), in which the cladding outer diameter is 180 μm.

FIG. 6 illustrates structural parameters of the first core portion 100A in each of samples #1 to #4, namely, a relative refractive index difference $\Delta_{co,1}$ [%] of the core 110A, a relative refractive index difference $\Delta_{ic,1}$ [%] of the inner cladding 120A, a relative refractive index difference $\Delta_{t,1}$ [%] of the trench layer 130A, a radius $a_1$ [μm] of the core 110A, an outer radius $b_1$ [μm] of the inner cladding 120A, and an outer radius $c_1$ [μm] of the trench layer 130A, with respect to the refractive index of the common cladding 200 (a refractive index level $LV_{clad}$ of the common cladding 200 is illustrated in FIG. 3), as a reference. FIG. 6 further illustrates structural parameters of the second core portion 100B in each of samples #1 to #4, namely, a relative refractive index difference $\Delta_{co,2}$ [%] of the core 110B, a relative refractive index difference $\Delta_{ic,2}$ [%] of the inner cladding 120B, a relative refractive index difference $\Delta_{t,2}$ [%] of the trench layer 130B, a radius $a_2$ [μm] of the core 110B, an outer radius $b_2$ [μm] of the inner cladding 120B, and an outer radius $c_2$ [μm] of the trench layer 130B, based on the refractive index of the common cladding 200, as a reference. In the table in FIG. 6, "OCT" is the shortest distance from the core center of the core portion farthest from the central axis AX of the MCF to the outer peripheral surface of the common cladding 200.

FIG. 7 is a table illustrating measurement results of each of samples #1 to #4 illustrated in FIG. 6. The table of FIG. 7 lists, for each of the first core portion 100A and the second core portion 100B, a cable cutoff wavelength $\lambda_{cc}$ [μm], a zero-dispersion wavelength $\lambda_0$ [μm], a dispersion slope (zero dispersion slope) $S_0$ [ps/(nm²·km)] at $\lambda_0$, MFD [μm], and the leakage loss LL [dB/km]. Moreover, "inter-core XT" in the table indicates crosstalk between the first core portion 100A and second core portion 100B adjacent to each other. The MFD is a value at a wavelength of 1310 nm. In the leakage loss LL and the inter-core XT, values at a wavelength of 1310 nm are illustrated for samples #1 to #3, and a value at a wavelength of 1625 nm is illustrated for sample #4. The inter-core XT indicates a value at a fiber bending radius of 0.14 m.

In standard SMFs with low transmission loss, which have recently been introduced, a transmission loss of about 0.3 dB/km is achieved at a wavelength of 1310 nm. From this fact, in order to achieve a transmission loss of 0.4 dB/km or less at the wavelength of 1310 nm in the MCF, it is preferable that the leakage loss LL to the coating at the wavelength of 1310 nm be 0.1 dB/km or less. The transmission loss of standard SMF is 0.32 dB/km or more and 0.35 dB/km or less at a wavelength of 1310 nm. Therefore, in order to achieve a transmission loss of 0.4 dB/km or less at a wavelength of 1310 nm in an MCF, the leakage loss LL to the coating at a wavelength of 1310 nm is preferably 0.08 dB/km or less, and more preferably 0.05 dB/km or less. As can be seen from FIG. 7, such requirement specifications are satisfied by the present embodiment.

As can be seen from the measurement results illustrated in FIG. 7, when the above-described structural conditions are satisfied by the first core portion 100A and the second core portion 100B, the MCFs 10A to 10C according to the first to third embodiments described above can achieve, as preferred optical characteristics, an MFD of 8.0 μm or more and 10.1 μm or less at a wavelength of 1310 nm, a cable cutoff wavelength of 1260 nm or less, and a transmission loss of 0.5 dB/km or less (preferably 0.4 dB/km or less) in a wavelength band of 1260 nm or more and 1360 nm or less. Furthermore, in the zero-dispersion wavelengths of the four core portions constituting the linear array group G0 (or the 12 core portions constituting the linear array groups G1 to G4), the difference (wavelength width) between the maximum zero-dispersion wavelength and the minimum zero-dispersion wavelength can be adjusted to 24 nm or less. In a state where the MCFs 10A to 10C are bent with a bending radius of 7 cm or more and 14 cm or less or a bending radius of 14 cm or more and 20 cm or less, the XT between the core 110A in the first core portion 100A and the core 110B in the second core portion 100B will be 0.01/km or less. The zero-dispersion wavelengths of the MCFs 10A to 10C can be set to a range 1300 nm or more and 1324 nm or less. Furthermore, the dispersion slope of the MCFs 10A to 10C at such a zero-dispersion wavelength is 0.092 ps/(nm²·km) or less. Furthermore, the bending loss of the MCFs 10A to 10C under a bend having a radius of curvature of 5 mm or more (preferably 3 mm or more) can be adjusted to 0.25 dB/turn or less at a wavelength of 1310 nm.

Figure 8:
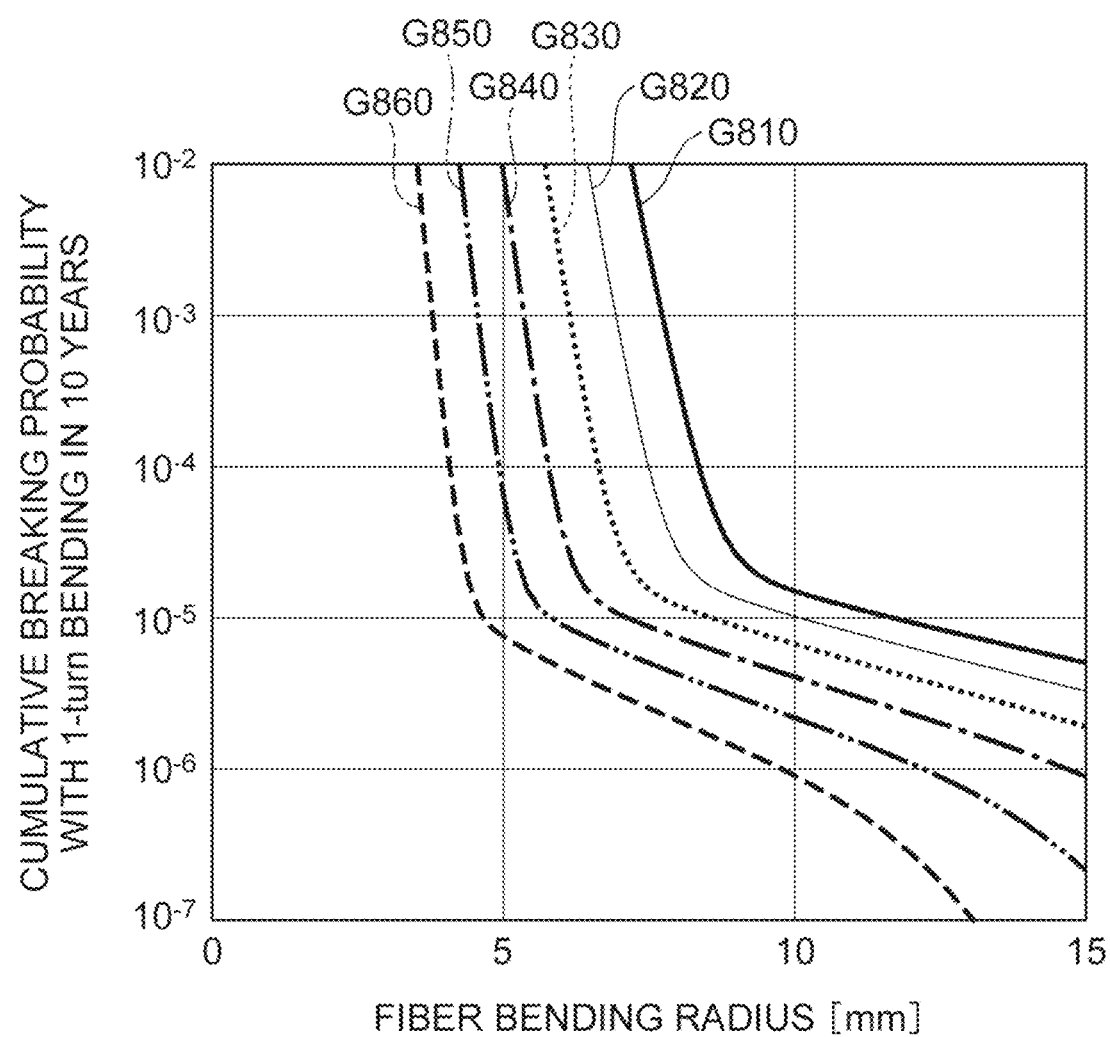
FIG. 8 is a graph illustrating a relationship between a fiber bending radius [µm] and cumulative breaking probability (breaking probability calculated assuming a lapse of 10 years with 1-turn bending) for a plurality of samples having different fiber diameters (outer diameter of the common cladding).

Next, the grounds for the appropriate range of the optical characteristics in the MCFs 10A to 10C of the present disclosure will be described. FIG. 8 is a graph illustrating a relationship between a fiber bending radius [μm] and cumulative breaking probability (breaking probability calculated assuming a lapse of 10 years with 1-turn bending) for a plurality of samples having different fiber diameters (outer diameter of the common cladding). In FIG. 8, graph G810 illustrates a measured value of a sample having a cladding outer diameter (the outer diameter of the common cladding 200 corresponding to the fiber diameter) of 250 μm, graph G820 illustrates a measured value of a sample having a cladding outer diameter of 225 μm, graph G830 illustrates a measured value of a sample having a cladding outer diameter of 200 μm, graph G840 illustrates a measured value of a sample having a cladding outer diameter of 175 μm, graph G850 illustrates a measured value of a sample having a cladding outer diameter of 150 μm, and graph G860 illustrates a measured value of a sample having a cladding outer diameter of 125 μm.

Setting the cladding outer diameter to 125±1 μm makes it possible to use peripheral components such as a conventional connector ferrule same as that is used in a standard SMF. Setting the cladding outer diameter to 125±1 μm or more and 180±1 μm or less enables coating using resin coating with the same outer diameter (about 250 μm) as that of a conventional standard SMF, making it possible to use the conventional cable technology. This is preferable in terms of cost reduction in the transmission system. Moreover, as illustrated in FIG. 8, while the breaking probability at the time of fiber bending increases together with the decrease of the radius of curvature of the fiber bending, a threshold radius of curvature at which the breaking probability sharply rises would increase together with the increase of the cladding outer diameter. It is preferable that the outer diameter of the cladding is 125±1 μm or less, because this setting can suppress the threshold radius of curvature to less than 5 mm.

When the transmission loss at a wavelength of 1310 nm is 0.5 dB/km, preferably 0.4 dB/km or less, there would be no significant increase in transmission loss with respect to a single-core SMF compliant with the currently widely used ITU-T G.652 and G.657 standards.

Furthermore, assuming that the transmission loss of the core not affected by the leakage loss LL is an intrinsic transmission loss of the core, it would be possible to achieve the intrinsic transmission loss of the core about 0.3 dB/km at a wavelength of 1310 nm with a pure silica core. It would be possible to achieve 0.32 dB/km or more and 0.35 dB/km or less with a $GeO_2$ doped core. Therefore, in the MCF of the present disclosure, a "transmission loss" obtained by adding the "leakage loss LL" to the "intrinsic transmission loss of the core" at a wavelength of 1310 nm is preferably 0.5 dB/km, more preferably 0.4 dB/km or less. It is still more preferable that this "transmission loss" be 0.4 dB/km or less in the entire range of the O-band.

Setting the MFD at a wavelength of 1310 nm to 8.0 μm or more and 10.1 μm or less makes it possible to reduce the connection loss with a system or a component based on a conventional standard SMF. Furthermore, the connection loss can be suppressed to a small value even with an occurrence of a certain degree of axis deviation.

At a wavelength of 1310 nm, the bending loss when a radius of curvature R is 5 mm or more or 3 mm or more is preferably 0.25 dB/turn or less. In this case, a large increase in transmission loss can be suppressed even when a fiber with a small radius of curvature is given in the use for optical interconnect wiring in high performance computing or a data center. Setting the bending loss at a radius of curvature R of 3 mm is 0.10 dB/turn or less at a wavelength of 1310 nm makes it possible to further suppress the transmission loss even under more severe conditions.

Setting the zero-dispersion wavelength is 1300 nm or more and 1324 nm or less makes it possible to suppress the chromatic dispersion in the O-band used for short-haul optical transmission. This enables suppression of the cost of chromatic dispersion compensation (cost and power consumption cost) in transceivers.

Setting the cable cutoff wavelength to 1260 nm or less makes it possible to ensure single mode operation in the O-band used for short-haul optical transmission. It is more preferable to set a 2m cutoff wavelength to 1260 nm or less.

Setting the XT between adjacent cores to 0.001/km or less at a wavelength of 1310 nm makes it possible to sufficiently suppress the noise caused by the inter-core XT in a case where signal light is transmitted in the reverse propagation direction between adjacent cores. Furthermore, setting the XT between adjacent cores is 0.001/km or less makes it possible to sufficiently suppress the noise caused by the inter-core XT even in a case where signal light is transmitted in the same propagation direction in all cores.

As described above, the transmission loss at the wavelength of 1550 nm or 1625 nm is greater than 0.4 dB/km in the core having the shortest distance from the core center to the resin coating, among the four or more cores. Intentionally setting to a large value not conforming to the ITU-T G.652 or G.657 standards makes it possible to achieve a smaller OCT. In this case, since the outermost core can be brought close to the coating, making it possible to pack more cores in a state of being arranged in series in a cladding having an outer diameter of about 125 μm. This also makes it possible to pack a core having a larger MFD into a cladding having an outer diameter of about 125 μm. Furthermore, this expands a manufacturing design margin for the variation in inter-core XT and the spacing Λ (the center-to-center distance between the adjacent cores).

Setting the chromatic dispersion slope at the zero-dispersion wavelength to 0.092 ps/(nm² km) or less makes it possible to suppress the signal waveform distortion due to higher-order chromatic dispersion during high-speed optical transmission. Moreover, it is also possible to suppress the maximum value of chromatic dispersion in the used band (suppress the signal waveform distortion) in the case of using a wide wavelength range in the O-band for wavelength division multiplexing transmission.

The MCF of the present disclosure is preferably an all solid-state fiber with no holes in the cladding. In the case of an MCF having holes, foreign matter such as water can enter the holes and affect the transmission characteristics of the core. It would be necessary to perform a process of closing the hole at the fiber end surface in order to suppress this effect, and furthermore, the presence of the hole would increase the cost of fiber connection and connector attachment to the fiber. Moreover, the presence of the hole would also increase manufacturing cost because it would be necessary to finely control the air pressure in the holes (necessary to control the hole diameter to bring the optical characteristics of the core to a desired value) during fiber drawing.

As described above, according to the MCF of the present disclosure, it is possible to simultaneously achieve excellent economic rationality and high compatibility in short-haul optical transmission.

What is claimed is:

1. A multi-core optical fiber comprising:
    a plurality of core portions extending along a central axis, each of the core portions including a core extending along the central axis, an inner cladding surrounding an outer periphery of the core, and a trench layer surrounding an outer peripheral surface of the inner cladding;
    a common cladding surrounding an outer peripheral surface of the trench layer of each of the plurality of core portions and having an outer diameter of 124 μm or more and 181 μm or less; and
    a resin coating having an outer diameter of 195 μm or more and 250 μm or less while surrounding an outer peripheral surface of the common cladding,
    wherein the multi-core optical fiber includes a linear array group constituted by at least four core portions, each of the four core portions having a core center being located on a straight line defined on a cross section of the multi-core optical fiber, the cross section being orthogonal to the central axis,
    each of the four core portions constituting the linear array group has a refractive index profile in which at least a relative refractive index difference between the core and the inner cladding is equal to the others,
    the four core portions include first core portions and second core portions alternately arranged along the straight line and having a spacing Λ [μm] between individual core centers, relative refractive index differences of the first core portions and the second core portions with respect to a refractive index of the common cladding differ by 0.001 Λ [%] or more, and
an outer radius of the trench layer in the first core portions is different from an outer radius of the trench layer in the second core portions.

2. The multi-core optical fiber according to claim 1,
wherein each of the four core portions has a mode field diameter of 8.0 µm or more and 10.1 µm or less at a wavelength of 1310 nm, a cable cutoff wavelength of 1260 nm or less, and a transmission loss of 0.5 dB/km or less in a wavelength band of 1260 nm or more and 1360 nm or less,
a difference between a maximum zero-dispersion wavelength and a minimum zero-dispersion wavelength among zero-dispersion wavelengths of the four core portions is 24 nm or less, and
crosstalk between the core of one of the first core portions and the core of one of the second core portions adjacent to the one of the first core portions in a state where the multi-core optical fiber is bent at a bending radius of 7 cm or more and 14 cm or less or a bending radius of 14 cm or more and 20 cm or less is 0.01/km or less.

3. The multi-core optical fiber according to claim 1, wherein the first core portions and the second core portions satisfy the following relationship:

$\Delta_{co,1} > \Delta_{ic,1} > \Delta_{t,1}$ $\Delta_{co,2} > \Delta_{ic,2} > \Delta_{t,2}$ $0.32\% \leq \Delta_{co,1} - \Delta_{ic,1} \leq 0.40\%$ $0.32\% \leq \Delta_{co,2} - \Delta_{ic,2} \leq 0.40\%$ $\Delta_{t,1} \leq 0\%$ $\Delta_{t,2} < 0\%$ $\Delta_{ic,1} \leq 0.10\%$ $-0.10\% \leq \Delta_{ic,2}$, where, as structural parameters of the first core portions, $\Delta_{co,1}$ [%], $\Delta_{ic,1}$ [%], and $\Delta_{t,1}$ [%] are respectively defined as the relative refractive index differences of the core, the inner cladding, and the trench layer with respect to the refractive index of the common cladding, and
as structural parameters of the second core portions, $\Delta_{co,2}$ [%], $\Delta_{ic,2}$ [%], and $\Delta_{t,2}$ [%] are respectively defined as the relative refractive index differences of the core, the inner cladding, and the trench layer with respect to the refractive index of the common cladding.

4. The multi-core optical fiber according to claim 3, wherein the first core portions and the second core portions satisfy the following relationship:

$\Delta_{t,1} \leq -0.5\%$ $\Delta_{t,2} \leq -0.5\%$ $0.34 \leq a_1/b_1 \leq 0.42$ $0.34 \leq a_2/b_2 \leq 0.42$, where, as structural parameters of the first core portions, $2a_1$ [µm], $2b_1$ [µm], and $2c_1$ [µm] are respectively defined as outer diameters of the core, the inner cladding, and the trench layer, and
as structural parameters of the second core portions, $2a_2$ [µm], $2b_2$ [µm], and $2c_2$ [µm] are respectively defined as outer diameters of the core, the inner cladding, and the trench layer.

5. The multi-core optical fiber according to claim 1, wherein the multi-core optical fiber has a zero-dispersion wavelength of 1300 nm or more and 1324 nm or less.

6. The multi-core optical fiber according to claim 5, wherein the multi-core optical fiber has a dispersion slope of 0.092 ps/(nm²·km) or less at the zero-dispersion wavelength.

7. The multi-core optical fiber according to claim 1, wherein the multi-core optical fiber has a bending loss of 0.25 dB/turn or less at a wavelength of 1310 nm under a bend having a radius of curvature of 5 mm or more.

8. The multi-core optical fiber according to claim 3, wherein the common cladding has an outer diameter of 124 µm or more and 126 µm or less, and
the spacing Λ [µm] satisfies the following condition:

22.5 µm ≤ Λ ≤ 27.8 µm.

9. The multi-core optical fiber according to claim 8, wherein a spacing w [µm] is defined as a shortest distance between the outer peripheral surface of the trench layer of one of the first core portions and the outer peripheral surface of the trench layer of one of the second core portions adjacent to the one of the first core portions, or defined as a value given by the expression:

$\Lambda - (c_1 + c_2)$, wherein the spacing w [µm] and the spacing Λ [µm] satisfy the following relationship:

0 µm ≤ w ≤ 2.49 µm $0.0133w^3 - 0.129w^2 + 0.885w + 22.5 \leq \Lambda \leq -1.46w + 27.8$, and wherein a deviation d [µm] between a midpoint of a first line segment and a midpoint of a second line segment is given by the following Formula (1):

$$d = \left(c_1 + \frac{w}{2}\right) - \frac{\Lambda}{2}, \quad (1)$$

the first line segment being a line segment connecting the outer peripheral surfaces of the trench layers of the first and second core portions with the shortest distance,
the second line segment being a line segment connecting the core centers of the first and second core portions, and
wherein the deviation d [µm] satisfies the following relationship:

$d \leq -(0.104w + 0.324)\Lambda^2 + (5.721w + 19.220)\Lambda - (79.360w + 271.139)$ $d \leq -0.246\Lambda - 0.501w + 6.471$ $d \geq 0.439\Lambda + 0.501w - 12.539$.

10. The multi-core optical fiber according to claim 4, wherein the common cladding has an outer diameter of 124 µm or more and 126 µm or less, and
the spacing Λ [µm] satisfies the following condition:

22.5 µm ≤ Λ ≤ 27.8 µm.

11. The multi-core optical fiber according to claim 10,
wherein a spacing w [μm] is defined as a shortest distance between the outer peripheral surface of the trench layer of one of the first core portions and the outer peripheral surface of the trench layer of one of the second core portions, or defined as a value given by the expression:

$\Lambda - (c_1 + c_2)$, wherein the spacing w [μm] and the spacing $\Lambda$ [μm] satisfy the following relationship:

0 μm ≤ w ≤ 2.49 μm $0.0133w^3 - 0.129w^2 + 0.885w + 22.5 \leq \Lambda \leq -1.46w + 27.8$,
and wherein a deviation d [μm] between a midpoint of a first line segment and a midpoint of a second line segment is given by the following Formula (1):

$$d = \left(c_1 + \frac{w}{2}\right) - \frac{\Lambda}{2}, \quad (1)$$

the first line segment being a line segment connecting the outer peripheral surfaces of the trench layers of the first and second core portions with the shortest distance,
the second line segment being a line segment connecting the core centers of the first and second core portions, and
wherein the deviation d [μm] satisfies the following relationship:

$d \leq -(0.104w + 0.324)\Lambda^2 + (5.721w + 19.220)\Lambda - (79.360w + 271.139)$ $d \leq -0.246\Lambda - 0.501w + 6.471$ $d \geq 0.439\Lambda + 0.501w - 12.539$.

12. The multi-core optical fiber according to claim 1,
wherein the plurality of core portions including the linear array group is arranged, on a cross section of the multi-core optical fiber, such that positions of the individual core centers are in line symmetry with respect to a reference straight line passing through an intersection between the central axis and the cross section, as a symmetry axis.

13. The multi-core optical fiber according to claim 12,
wherein the multi-core optical fiber includes a marker having a refractive index different from the refractive index of the common cladding and being arranged at a position that cancels the symmetry of an arrangement of the core centers in the plurality of core portions.

14. The multi-core optical fiber according to claim 1,
wherein a midpoint of a straight line connecting the core center of one of the first core portions and the core center of one of the second core portions adjacent to the one of the first core portions is closer to an outer peripheral surface of the trench layer of the one of the second core portions than to an outer peripheral surface of the trench layer of the one of the first core portions.

15. The multi-core optical fiber according to claim 1,
wherein the plurality of core portions including the linear array group is arranged, on the cross section of the multi-core optical fiber, such that positions of the individual core centers have two-fold or more rotational symmetry with respect to an intersection between the central axis and the cross section, as a rotational center.

16. The multi-core optical fiber according to claim 15,
wherein the multi-core optical fiber includes a marker having a refractive index different from the refractive index of the common cladding and being arranged at a position that cancels the symmetry of an arrangement of the core centers in the plurality of core portions.

17. The multi-core optical fiber according to claim 15,
wherein an outer radius of the trench layer in the first core portions is different from an outer radius of the trench layer in the second core portions.

* * * * *